United States Patent Office 3,549,688
Patented Dec. 22, 1970

3,549,688
PROCESS FOR THE PREPARATION OF
CARBOXYLIC ACID ESTERS
Herman L. Finkbeiner, Schenectady, N.Y., assignor to
General Electric Company, a corporation of New York
No Drawing. Filed Feb. 16, 1967, Ser. No. 616,500
Int. Cl. C07c 69/24
U.S. Cl. 260—468                                    7 Claims

ABSTRACT OF THE DISCLOSURE

Carboxylic acid esters of aliphatic alcohols are produced by the reaction of a trihydrocarbonsilyl ester of a carboxylic acid with an aliphatic alcohol in the presence of an anhydrous hydrogen chloride. The esters produced can be employed as solvents for chemical reactions, as solvents in resin systems, and as intermediates in organic syntheses, etc.

---

It is known in the art that esters of carboxylic acids can be produced by forming a mixture of the carboxylic acid and an alcohol in the presence of a mineral acid. The reaction is an equilibrium reaction and can generally be driven to completion by heating the mixture to a temperature sufficiently elevated to cause the removal of the water formed by this reaction. This process suffers from the disadvantage that when a carboxylic acid, which decomposes at elevated temperatures is employed, decomposition takes place leading to by-products which render the separation of the esters very difficult, if not impossible, and further leads to low yields of the esters.

It is also known in the art to react trihydrocarbonsilyl carboxylates with alcohols. However, this reaction produces only the trihydrocarbonalkoxysilane and the free carboxylic acid. This reaction is depicted by the following equation:

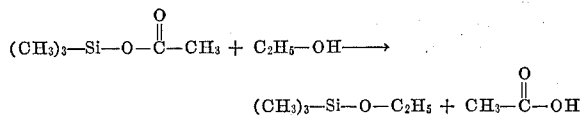

It is an object of this invention to provide a means of producing esters of carboxylic acids in high yields from trihydrocarbonsilyl carboxylates employing reaction conditions which are not as severe as those heretofore employed in the art.

In accordance with the process of this invention, a trihydrocarbonsilyl ester of an organic carboxylic acid of the formula (I)

wherein R is a monovalent hydrocarbon radical or a halogenated monovalent hydrocarbon radical and R′ is an organic moiety, is added under anhydrous conditions to a solution of hydrogen chloride in an aliphatic alcohol of the formula:

(II)                    R″—OH wherein R″ is an alkyl group having from 1 to 10 carbon atoms, or an alkoxy alkyl group containing a total of 10 carbon atoms at ambient temperatures. The reaction of the aliphatic alcohol of Formula II and the trihydrocarbonsilyl ester of Formula I is almost instantaneous and yields esters of the formula:

(III)

wherein R′ and R″ have the above defined meanings.

The ester can be recovered by pouring the reaction mixture into water and extracting the water-reaction mixture with a solvent such as diethyl ether and subsequently, evaporating the ether and drying the ester. The ester can be purified by distillation or by crystallization.

The ratio of reactants employed in the process of this invention is not narrowly critical and one can employ from 0.1–10 moles of the trihydrocarbonsilyl ester of Formula I to from 10 to 0.1 moles of the aliphatic alcohol of Formula II. It is, of course, preferred for completeness of reaction and ease of recovery of the reaction products, that one employ at least 1 mole of the aliphatic alcohol for each carboxyl group of the trihydrocarbonsily ester of Formula I.

The amount of hydrogen chloride employed in the process of this invention can vary over wide ranges. One can employ from 1–100 moles of hydrogen chloride for each mole of the reactants. For completeness of reaction and in order to obtain high yields, it is preferred to employ at least two moles of hydrogen chloride for each mole of the combined total of the reactants.

The temperature at which the process of this invention is conducted can vary from as low as −20° to as high as 100° C. or even higher. As has previously been stated, the process of this invention offers the advantage that normally ambient temperatures, that is, temperatures of approximately 15° to 35° C. can be employed in the process of this invention and one can still obtain high yields of the ester products.

The process of the instant invention is normally carried out at atmospheric pressure. However, subatmospheric and superatmospheric pressures can be employed but no commensurate advantages are obtained thereby.

A solvent is not necessary in conducting the process of the instant invention. However, a solvent may be employed if desired. The solvents which are useful in the process of this invention are those which do not contain an active hydrogen and which can be obtained in an anhydrous condition. Such solvents are, for example, the aliphatic ethers such as diethyl ether, diisopropyl ether, ethylmethyl ether, etc., the aromatic hydrocarbon solvents such as benzene, toluene, xylene, etc., cyclic ethers such as tetrahydrofuran, dioxane, etc. and polyethers, such as the dimethyl ether of ethylene glycol, dimethyl ether of diethylene glycol, the diethyl ether of diethylene glycol, the dimethyl ether of propylene glycol, etc.

The monovalent hydrocarbon radicals which R represents include alkyl radicals such as methyl, ethyl, isopropyl, tert.-butyl, etc.; alkenyl radicals such as vinyl, allyl, methallyl, decenyl, butadienyl, etc.; cycloalkyl radicals such as cyclopentyl, cyclohexyl, etc.; cycloalkenyl such as cyclopentenyl, cyclohexenyl, cyclohexadienyl, etc.; aryl radicals such as phenyl, xenyl, naphthyl, etc.; aralkyl radicals such as benzyl, beta-phenylethyl, beta-phenyl-propyl, etc.; alkaryl radicals such as tolyl, xylyl, etc., and the halogenated derivatives thereof which include chloromethyl, gamma-chloropropyl, bromocyclohexyl, perfluorovinyl, chlorocyclohexyl, trifluoropropyl, pentafluorobutyl, dibromophenyl, pentachlorophenyl, α,α,α-trifluorotolyl, etc.

The organic moieties represented by R′ in Formula I include, for example, the monovalent hydrocarbon radicals and halogenated monovalent hydrocarbon radicals set forth above for R. The monovalent organic moieties represented by R′ can also contain hydroxyl groups, amino groups, carbonyl groups, and one or more trihydrocarbonsilyl carboxylate groups, etc. Illustrative of the trihydrocarbonsilyl esters of Formula I are, for example, trimethylsilyl acetate, tripropylsilyl propionate, triphenylsilyl acetate, trimethylsilylbenzoate,

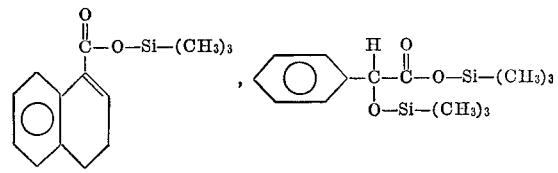

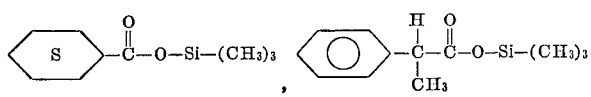

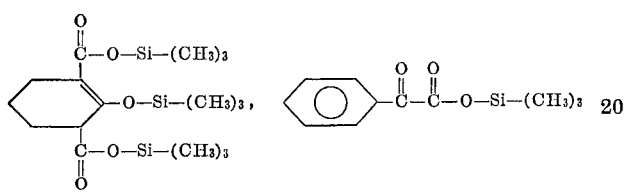

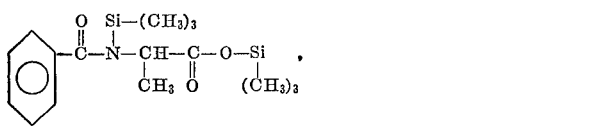

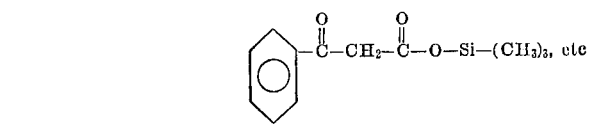

The aliphatic alcohols of Formula II which can be employed in the process of this invention include, for example, methanol, ethanol, propanol, isopropanol, butanol, tertiary butanol, hexanol, heptanol, and its isomers, octanol and its isomers, methoxyethanol, ethoxyethanol, methoxypropanol, ethoxypropanol, etc.

The starting trihydrocarbonsilyl esters of the organic carboxylic acids of Formula I can be prepared by the reaction of the corresponding organic carboxylic acids with a monochlorotrihydrocarbonsilane in the presence of a tertiary amine such as triethylamine, pyridine and the like or they can be prepared by the reaction of the organic carboxylic acids with a trihydrocarbonsilylacylamide which can be prepared by the reaction of a carboxylic acid amide with a mono-chlorotrihydrocarbonsilane in the presence of pyridine or tertiary amine.

The carboxylic acid esters produced in accordance with the process of this invention have a wide variety of uses which are known in the art. For example, they can be employed as solvents for chemical reactions, solvents in resin systems, as intermediates in organic synthesis, etc.

The following examples serve to further illustrate this invention. All parts are by weight unless otherwise stated.

EXAMPLE 1

The trimethylsilyl derivative of benzoyl acetic acid (1.0 millimole) was dissolved in diethyl ether (1 ml.) and was added to 10 ml. of methanol containing 20 millimoles of hydrogen chloride. The mixture was allowed to stand for ten minutes at 5° C. and the solution was poured into 20 ml. of water and the ester extracted with diethyl ether. The ether was evaporated off and the residue distilled to yield the methyl ester of benzoyl acetic acid in an 86% yield based on the starting trimethylsilyl derivative of the benzoyl acetic acid. The above reaction was repeated using 10 ml. portions of methanol which contained 10, 5 and 2 millimoles of hydrogen chloride, respectively and yielded the methyl ester with yields of 76%, 69% and 15%, respectively.

EXAMPLE 2

Five millimoles of a diethyl ether solution of 10 millimoles of

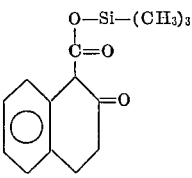

was added to 10 ml. of 2.0 molar methanolic hydrogen chloride at 5° C. The mixture was allowed to stand for ten minutes and then poured into water and the water extracted with additional diethyl ether. The ether extract was evaporated and the product distilled to yield the methyl ester of the formula

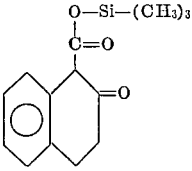

which was analyzed as containing 70.5% carbon and 5.9% hydrogen.

EXAMPLE 3

A diethyl ether solution (5 ml.) of 10 millimoles of the compound

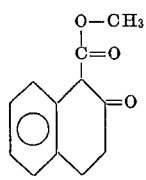

was added to 10 ml. of 2.0 molar methanolic hydrogen chloride at 5° C. The reaction mixture was allowed to stand for 10 minutes and was then poured into water and the ester extracted with additional ether. The ether extract was evaporated to dryness to yield the methyl ester

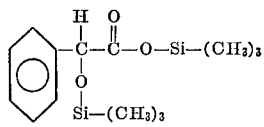

having a melting point of 55° C. which analyzed carbon 65.0%, hydrogen 6.0% and was obtained in a greater than 85% yield.

EXAMPLE 4

A diethyl ether solution (5 ml.) of the compound

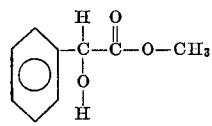

(10 millimoles) was added to 10 ml. of 2.0 molar methanolic hydrogen chloride at 5° C. The reaction mixture was allowed to stand 10 minutes and then poured into water and the ester extracted with additional ether. The ether extract was evaporated and the residue distilled to yield a methyl ester

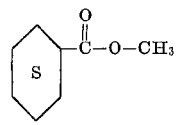

having a boiling point of 75° C. at 15 mm. of mercury in greater than 85% yield. The compound analyzed 67.5% carbon and 9.8% hydrogen.

EXAMPLE 5

A diethyl ether solution (5 ml.) of the compound

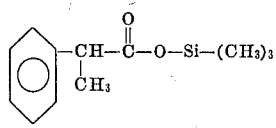

(10 millimoles) was added to 10 ml. of 2.0 molar methanolic hydrogen chloride at 5° C. The reaction mixture was allowed to stand 10 minutes and then poured into water and the ester extracted with additional ether. The ether extract was evaporated and the residue distilled to yield a methyl ester

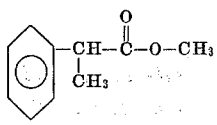

having a boiling point of 119° C. at 20 mm. of mercury in greater than 85% yield. The compound analyzed 73.0% carbon and 7.2% hydrogen.

EXAMPLE 6

A diethyl ether solution (5 ml.) of 10 millimoles of the compound

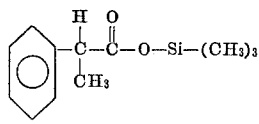

was added to 10 ml. of 2.0 molar isopropanolic hydrogen chloride at 5° C. The reaction mixture was allowed to stand for 10 minutes and was then poured into water and the ester extracted with additional ether. The ether extract was evaporated to dryness to yield the isopropyl ester

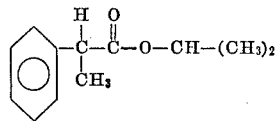

which analyzed carbon 75.0%, hydrogen 8.3% and was obtained in a greater than 85% yield.

EXAMPLE 7

A diethyl ether solution (5 ml.) of 10 millimoles of the compound

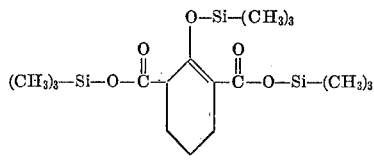

was added to 10 ml. of 2.0 molar methanolic hydrogen chloride at 5° C. The reaction mixture was allowed to stand for 10 minutes and was then poured into water and the ester extracted repeatedly with additional ether. The ether extract was evaporated to dryness to yield the methyl ester

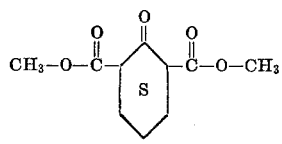

having a melting point of 144–146° C. which analyzed carbon 56.0%, hydrogen 6.5% and was obtained in a greater than 85% yield.

EXAMPLE 8

A diethyl ether solution (5 ml.) of 10 millimoles of the compound

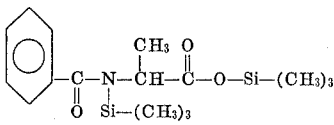

was added to 10 ml. of 2.0 molar ethanolic hydrogen chloride at 5° C. The reaction mixture was allowed to stand for 10 minutes and was then poured into water and the ester extracted with additional diethyl ether. The ether extract was evaporated to dryness to yield the ethyl ester

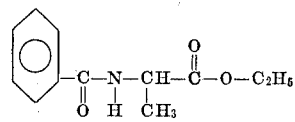

having a melting point of 77° C. which analyzed carbon 65.0%, hydrogen 6.8%, and nitrogen 6.3% and was obtained in a greater than 85% yield.

EXAMPLE 9

A diethyl ether solution (5 ml.) of the compound

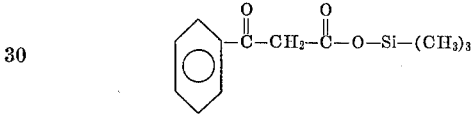

(10 millimoles) was added to 10 ml. of 2.0 molar methanolic hydrogen chloride at 5° C. The reaction mixture was allowed to stand 10 minutes and then poured into water and the ester extracted with additional ether. The ether extract was evaporated and the residue distilled to yield a methyl ester

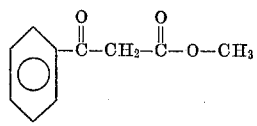

having a boiling point of 152° C. at 15 mm. of mercury in greater than 85% yield. The compound analyzed 67.3% carbon and 5.1% hydrogen.

It will, of course, be apparent to those skilled in the art that modifications other than those set forth in the above examples can be employed in the process of this invention without departing from the scope thereof.

What I claim as new and desire to secure by Letters Patent of the United States is:

1. A process for making aliphatic esters of carboxylic acids which comprises agitating under anhydrous conditions at a temperature in the range of from about −20° C. to 100° C. and in the presence of hydrogen chloride, a mixture comprising a trihydrocarbonsilylester of the formula,

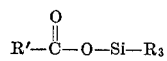

and an aliphatic alcohol of the formula,

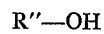

where R is a monovalent radical having up to 10 carbon atoms selected from alkyl radicals, alkenyl radicals, cycloalkyl, cycloalkenyl, aryl radicals, arylalkyl radicals, and halogenated derivatives of such radicals, R' is selected from R radicals and R radicals substituted with a radical selected from hydroxy, amino, carbonyl, and trihydrocarbonsilyl carboxylate, R" is a monovalent radical having up to 10 carbon atoms selected from alkyl radicals and alkoxyalkyl radicals.

2. The process in claim 1 wherein the trihydrocarbonsilyl derivative has the formula

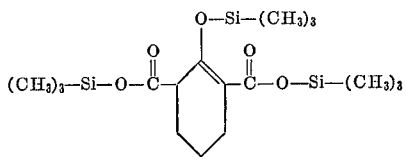

3. The process in claim 1 wherein the trihydrocarbonsilyl derivative has the formula

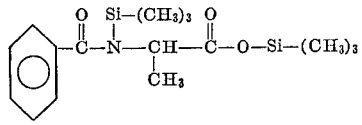

4. The process in claim 1 wherein the trihydrocarbonsilyl derivative has the formula

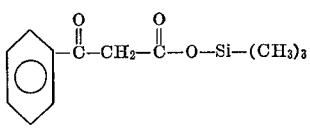

5. The process in claim 1 wherein the amount of hydrogen chloride employed is from 2 to 20 moles of hydrogen chloride per mole of the trihydrocarbonsilyl derivative of the organic carboxylic acid.

6. The process in claim 1 wherein the trihydrocarbonsilyl derivative has the formula

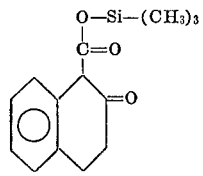

7. The process in claim 1 wherein the trihydrocarbonsilyl derivative has the formula

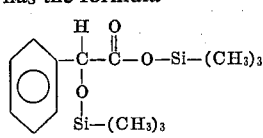

References Cited

JACS, 88, 3390 (1966), July 20, 1966.

LORRAINE A. WEINBERGER, Primary Examiner

P. J. KILLOS, Assistant Examiner

U.S. Cl. X.R.

260—448.2, 469, 471, 473, 475, 476, 482, 483, 484, 486, 487, 491